(12) United States Patent
Schnalke et al.

(10) Patent No.: US 8,782,312 B2
(45) Date of Patent: Jul. 15, 2014

(54) METHOD FOR DATA TRANSMISSION BY TELEGRAM

(75) Inventors: Michael Schnalke, Nesselwang (DE); Manfred Niederer, Sonthofen (DE); Stephan Damith, Nesselwang (DE); Peter Biechele, Freiburg (DE)

(73) Assignees: Endress + Hauser Wetzer GmbH + Co. KG, Obere Wank 1, Nesselwang (DE); SafeIn Train GmbH, Bettackerstr. 14, Freiburg (DE)

( * ) Notice: Subject to any disclaimer, the term of this patent is extended or adjusted under 35 U.S.C. 154(b) by 0 days.

(21) Appl. No.: 13/612,140

(22) Filed: Sep. 12, 2012

(65) Prior Publication Data

US 2013/0097342 A1  Apr. 18, 2013

Related U.S. Application Data

(60) Provisional application No. 61/546,169, filed on Oct. 12, 2011.

(30) Foreign Application Priority Data

Oct. 12, 2011  (DE) .......................... 10 2011 084 364

(51) Int. Cl.
*G06F 3/00* (2006.01)
*G06F 13/00* (2006.01)

(52) U.S. Cl.
USPC .............. 710/106; 710/33; 710/305; 714/779

(58) Field of Classification Search
CPC ................................... G06F 3/00; G06F 13/00

USPC .............. 710/105–107, 29–33, 305; 714/746, 714/779
See application file for complete search history.

(56) References Cited

U.S. PATENT DOCUMENTS

| 6,754,721 B2 * | 6/2004 | Heckel .............................. 710/4 |
| 6,915,444 B2 | 7/2005 | Vasko |
| 7,203,885 B2 | 4/2007 | Gibart |
| 7,453,902 B2 * | 11/2008 | Barthel et al. ................. 370/447 |
| 7,900,115 B2 * | 3/2011 | Bruckner et al. ............. 714/748 |
| 8,127,195 B2 * | 2/2012 | Bruckner et al. ............. 714/748 |
| 8,484,546 B2 * | 7/2013 | Suzuki .......................... 714/807 |
| 2005/0055585 A1 * | 3/2005 | Maier ........................... 713/300 |
| 2006/0161705 A1 * | 7/2006 | Schultze et al. .............. 710/106 |
| 2009/0077455 A1 | 3/2009 | Mizutani |

(Continued)

FOREIGN PATENT DOCUMENTS

| DE | 102008040989 A1 | 4/2009 |
| DE | 102010001211 A1 | 6/2011 |

OTHER PUBLICATIONS

Samson AG: Teil 4 Kommunikation, 2000, Frankfurt, Germany.

(Continued)

*Primary Examiner* — Christopher Shin
(74) *Attorney, Agent, or Firm* — Bacon & Thomas, PLLC

(57) ABSTRACT

A method for data transmission by telegram via a fieldbus of process automation technology, wherein information is transmitted via the fieldbus in the form of data in at least one telegram, and wherein the information, especially the same information, is transmitted in the at least one telegram in a first data format and in a second data format, wherein the first data format differs from the second data format.

13 Claims, 1 Drawing Sheet

(56) References Cited

U.S. PATENT DOCUMENTS

| | | | |
|---|---|---|---|
| 2009/0083446 A1* | 3/2009 | Konieczny et al. | 710/2 |
| 2009/0138693 A1* | 5/2009 | Chomik et al. | 713/1 |
| 2011/0060855 A1* | 3/2011 | Kuschke et al. | 710/106 |
| 2011/0153036 A1 | 6/2011 | Colucci | |

OTHER PUBLICATIONS

International Search Report, EPO, The Netherlands, Nov. 29, 2012.

German Search Report, German Patent Office, Munich, Germany, Apr. 11, 2012.

* cited by examiner

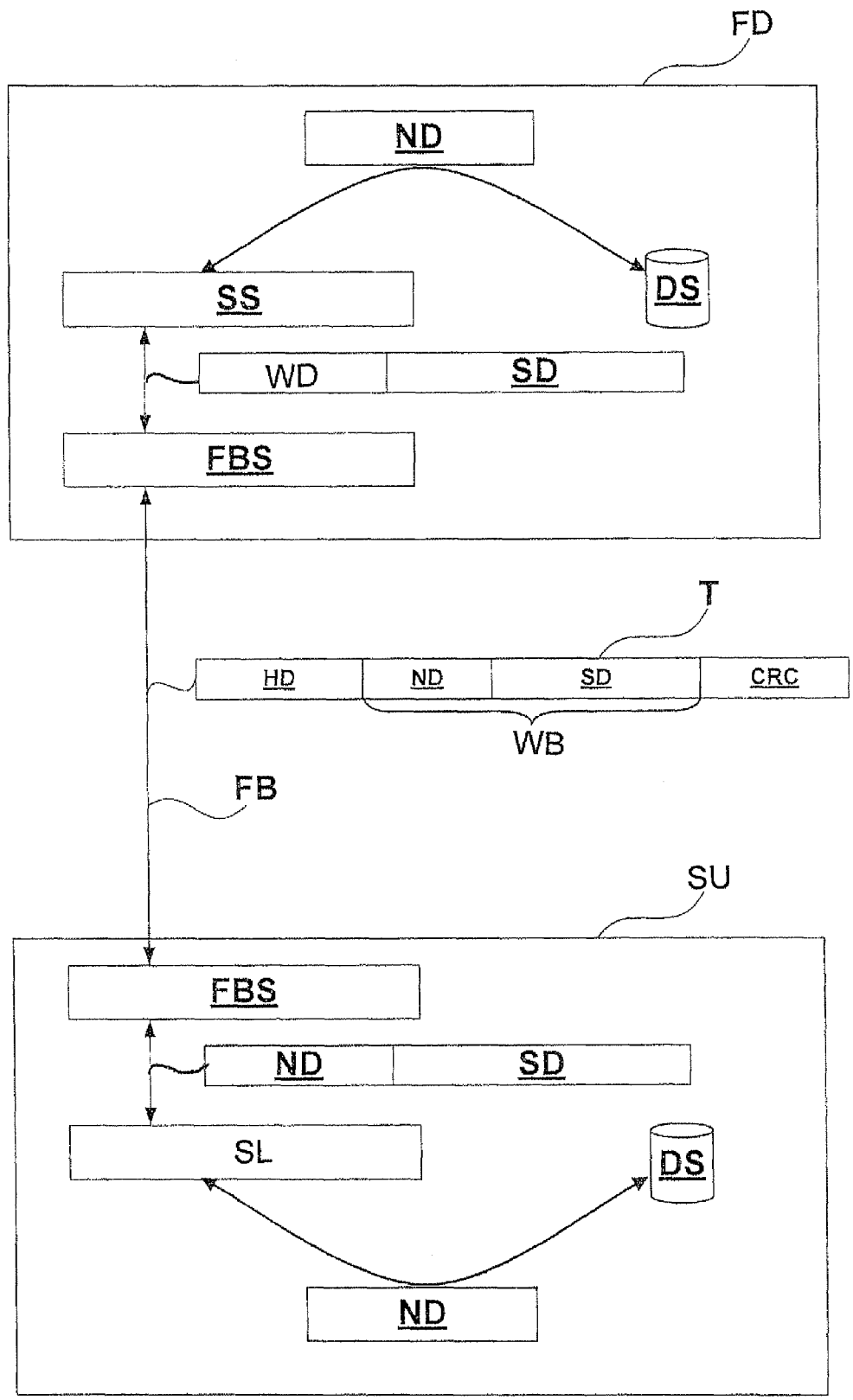

METHOD FOR DATA TRANSMISSION BY TELEGRAM

CROSS-REFERENCE TO RELATED APPLICATION

This application is a Nonprovisional Application which claims the benefit of U.S. application Ser. No. 61/546,169, filed on Oct. 12, 2011.

TECHNICAL FIELD

The invention relates to a method for data transmission by telegram via a fieldbus of process automation technology. Furthermore, the invention relates to a use of the method, to an arrangement comprising first and second participants of a fieldbus and to a corresponding field device.

BACKGROUND DISCUSSION

Offenlegungsschrift DE 102007032659 A1 discloses a method for data transmission by telegram. In such case, in a wanted data block of the telegram, besides the wanted data also a so-called test sum block is transmitted. The test sum is ascertained from the wanted data. It is an object of the Offenlegungsschrift to obtain an especially high wanted data length in a telegram, coupled with simultaneous high Hamming distance. To this end, the wanted data block is divided into wanted data subblocks and test sum subblocks. It is, however, disadvantageous, because then the wanted data are transmitted in pieces in different subblocks, this meaning additional effort in putting the data back together.

SUMMARY OF THE INVENTION

It is, consequently, an object of the present invention to provide an alternative, which assures error free transmission of data, while, however, not requiring chopping the wanted data into pieces.

The object is achieved by a method, a use of the method, an arrangement comprising two participants of a fieldbus system and a corresponding field device.

As regards the method, the object is achieved by features including that information is transmitted via the fieldbus in the form of data in at least one telegram, wherein the information, especially the same information, is transmitted in the at least one telegram in a first data format and in a second data format, wherein the first data format differs from the second data format.

It is thus an idea of the present invention to transmit information via a fieldbus redundantly and/or diversely. To this end, different data formats are used, which represent the information to be transmitted. In this way, in given cases, additional checking of the integrity of the transmitted data and/or of the fieldbus is made possible.

In an embodiment of the method, a telegram includes a wanted data block, which serves for transmission of the information in the form of data, wherein the information, especially the same information, is transmitted in the wanted data block in the at least one telegram, preferably exactly one telegram, in the first data format and in the second data format.

In an additional embodiment of the method, the data are in the form of a bit sequence and the second data format inverts the bit sequence of the first data format.

In an additional embodiment of the method, the second data format is a character code, for example, an ASCII code.

In an additional embodiment of the method, the first data format is a data format representing numbers, for example, an integer- or floating point representation.

In an additional embodiment of the method, it is predetermined by the first, respectively the second, data format, how the data contained in the wanted data block are interpreted in the case of loading, storing and/or processing.

In an additional embodiment of the method, the data in a first subblock of the wanted data block are in the first format and the data in a second subblock of the wanted data block are in the second format. The data, in such case, contain the same information but differ, however, as regards the data format in which they are transmitted.

In an additional embodiment of the method, the first and second subblocks are equally large, the first subblock is greater than the second subblock and/or the second subblock is greater than the first subblock.

In an additional embodiment of the method, the information present in the first, respectively second, format involves at least one, preferably exactly one, measured value of a process variable.

In an additional embodiment of the method, exactly one telegram is used for transmission of a measured value, or a parameter, especially preferably exactly one measured value, or exactly one parameter, wherein the measured value and/or the parameter are/is transmitted in the first data format and the second data format in the wanted data block of the telegram.

In an additional embodiment of the method, data are transmitted via the fieldbus according to the HART-protocol.

In an additional embodiment of the method, a telegram includes besides the wanted data block a telegram header leading the wanted data block and a test sum block following the wanted data block.

In an additional embodiment of the method, the data present in the first and second data formats, especially the data contained in the wanted data block, are compared with one another by a receiver of the telegram. The information present in the first and second data formats can thus be used for checking and/or monitoring the data transmission via the fieldbus.

In an additional embodiment of the method, in the case, in which the information present in the telegram in the first and second data formats do not agree, a corresponding error report is output. Additionally, an error reaction can be made to happen. Such an error reaction can be, for example, the actuating of an actuator, for example, a valve actuator, or the turning off, or closing down, of a process, for example, a process running in an industrial plant.

In an additional embodiment of the method, a telegram transmitted via the fieldbus includes, especially in the wanted data block, a sequence counter and/or a telegram number. The sequence counter and/or the telegram number permits deductions to be made concerning the sequence (especially the time sequence and time difference), in which the telegrams or the wanted data are transmitted via the fieldbus. Such an evaluation can be performed by the receiver of the telegram, or telegrams.

In an additional embodiment of the method, the wanted data block contains, furthermore, a time stamp. In this way, the time difference between, for example, the receipt of two telegrams can be monitored. In this way, a plausibility checking of the data transmission can occur, for example, based on furnished data or a furnished model. Thus, for example, the time difference between two telegrams received one after the other must, for example, always be positive, or negative, as the case may be. If this is not the case, then an error has occurred in the data transmission, or there has been an overtaking of telegrams.

As regards the use, the object is achieved by features including that the method according to one of the said embodiments is used for fulfillment of a safety function. Preferably, the method is used for fulfillment of the safety function according to IEC 61508, or 615011.

As regards the arrangement, the object is achieved by an arrangement comprising first and second participants of a fieldbus of process automation, wherein the first and second participants exchange preferably measured values and/or parameters, especially safety-relevant parameters, according to a method proposed in one of the embodiments. The method can be applied, for example, in a certain operating mode of a participant, for example, of a field device. Such an operating mode can be generally, for example, a secure parametering and/or secure data transmission. On the other hand, also certain especially critical applications in, for example, an industrial plant are options, in which an especially secure data transmission is desired.

As regards the field device, the object is achieved by a field device of process automation technology for data transmission by telegram via fieldbus according to the method of one of the embodiments. In such case, the first and/or the second participant of the proposed arrangement can be such a field device. Such field devices are applied, for example, in industrial plants, in order to control or to monitor processes running there, wherein the control may be open or closed loop control. Especially, it can, in such case, be a measuring device for registering a chemical and/or physical, measured variable.

BRIEF DESCRIPTION OF THE DRAWING

The invention will now be explained in greater detail based on the appended drawing, the sole FIGURE of which shows as follows:

FIG. 1 is a schematic representation of a data transmission by telegram between first and second participants of a fieldbus.

DETAILED DESCRIPTION IN CONJUNCTION WITH THE DRAWING

FIG. 1 shows a first participant FD of a fieldbus FB. First participant FD is, for example, a field device. The field device can be a sensor, an actuator or a service- and/or display unit for use in an industrial plant of process automation technology. Field devices of these categories are produced and sold by the assignee.

The first participant FD has a data memory DS, from which wanted data WD can be downloaded, or into which wanted data WD can be transmitted and/or stored. The wanted data WD can be, for example, measured values and/or parameters, or parameter values, which are stored by the first participant FD and/or are required for the intended operation. The wanted data are present, in such case, in a first data format, in which they are stored and/or processed.

These wanted data WD can be transmitted to another participant SU of the fieldbus FB. In principle, data exchange between the first and second participants FD, SU is possible via the fieldbus FB, via which the two are connected with one another.

The second participant SU is, for example, a superordinated unit, such as, for example, a control unit for the plant, a gateway, which enables a remote accessing of the plant, another field device or a service unit, which is used for servicing the field device, i.e. for adjusting settings, and/or a display unit, which serves for displaying data transmitted via the fieldbus FB. The second participant SU has likewise a data memory DS, in which data can be stored, such as, for example, measured values, which have been received, for example, via the fieldbus FB, parameters, etc.

The first and second participants FD, SU are, in such case, as stated, connected with one another via a fieldbus FB. Such fieldbusses FB are tailored especially for requirements typically reigning in an industrial plant, i.e. they are, for example, limited in their capabilities and have special protocols governing data transmission. Such a protocol and the correspondingly working fieldbus is, for example, the HART protocol, according to which data are transmitted via the fieldbus FB.

Digital communication via such a fieldbus FB occurs, in such case, in the form of telegrams, which usually have a telegram header HD, which contains, for example, the destination address, i.e., for example, the fieldbus address of the participant to which the telegram T is directed, and a wanted data block WB, in which the data intended for the receiver of the telegram T are transmitted. Furthermore, such a telegram T includes a test block, which, as known from the state of the art, contains a test sum. From the test sum CRC, which can be, for example, a CRC test sum or any other hash, the consistency of the data in the wanted data block WB is checked and thereby errors prevented and/or recognized in the data transmission. The test sum can come, for example, from the CRC-16, -32 or MD5 methods known from the state of the art.

Wanted data WD provided for transmission can be transferred from the data memory DS of the first participant FD to a security layer SL, which serves for ensuring the consistency of the wanted data WD. The security layer SL is, for example, a program, which determines from the wanted data WD corresponding security data SD. This security data SD contains the same information as the wanted data WD. According to an idea of the invention, the security data SD, however, exist in a data format other than that of the wanted data WD.

The wanted data WD are, in such case, as stated, stored in the data memory DS and/or processed by the first participant FD in a certain data format. The security layer SL converts the information present in the first data format WD into a second data format SD, and produces, so, a data block, which contains information redundantly, however, in diverse data formats WD, SD. This data block, which contains the wanted data WD and the security data SD, is then transmitted to a fieldbus stack FBS, which packages the data block into a telegram. The fieldbus stack FBS serves, in such case, especially for managing (as regards software) the communication via the fieldbus FB, wherein the operation of the fieldbus stack FBS is governed, in each case, by the fieldbus protocol applied for the communication. By means of the fieldbus stack FBS, the data block is then packaged into a telegram T. The telegram T, which contains the wanted data WD and the security data SD in the wanted data block WB of the telegram T, is then transmitted via the fieldbus FB to the second participant SU of the fieldbus FB. Besides the second participant SU, the fieldbus FB can naturally have also other participants (not shown).

In an additional variant, the wanted data WD and the security data SD can also be transmitted in two separate telegrams; then, however, for example, a telegram-counter, or sequence-counter, is required, in order to be able to associate the two telegrams upon their receipt.

The second participant SU receives the telegram T via its fieldbus stack FBS and extracts therefrom the wanted data block WB containing the wanted data WD and the security data SD. This data block is then processed in a security layer SL likewise provided in the second participant SU. In such case, the wanted data WD and the security data SD can be compared with one another and so checked for consistency. To this end, the information contained in the different data formats is compared. A corresponding program can be used for this. In case the comparison reports differences, a corresponding reaction can occur. This can be a renewed transmission of the data, the discarding and no further processing of the data and/or the reporting of an error to another entity, such as, for example, a service person and/or a control system, for example, a control system in the form of a control unit. The control system can then, for example, perform the further error handling. Furthermore, the proposed method can include a plausibility check of the obtained information, for example, using the deviation between the points in time and/or the time difference between the receipt of the two telegrams.

Then, the wanted data WD received, or transmitted, from the first participant can be displayed or further processed in the second participant SU (which is, for example, a servicing unit, preferably a handheld servicing unit) or stored in its data memory.

For transmission of the wanted data WD and the security data SD via the fieldbus FB, the telegram T can contain, besides the security data SD in the wanted data block WB, also a check sum block CRC, which likewise serves for checking the consistency of the data in the wanted data block WB. This check sum block CRC is, in such case, evaluated in the fieldbus stack FBS. In this way, a two stage method is provided, by which the consistency of the wanted data is checked.

In the above described manner, naturally also data transmission from the second participant SU to the first participant FD can occur. The present invention can, consequently, be applied not only for the secure transferring of measured values, i.e. wanted data WD, but also for secure parametering of a field device. Additionally, also application for secure transmission and setting/configuration of parameters of a field device is an option. In such case, for example, servicing devices and/or operating programs, or a corresponding communication channel can be non-secure in accordance with the standard IEC 61508. The present invention permits, for example, by confirmation by a user, to whom the information transmitted in the wanted data block WB is displayed, the correct transmission of the data to be checked and therewith the standard IEC 61508 in combination with EN 50159 to be fulfilled.

The invention claimed is:

1. A method for data transmission by telegram via fieldbus of process automation technology, comprising the steps of:
   transmitting information via the fieldbus in the form of data in a first data format; and
   transmitting the same information in a second data format, wherein:
   the first data format differs from the second data format;
   said information represents a measured value or a parameter of the field device;
   exactly one telegraph is used for transmission of said information in the first data format and the second data format via the fieldbus from the field device to a receiver of the telegram which telegram comprises a wanted data block which contains said information in the first data format and the second data format; and
   the information contained in the first data format is compared to the information contained in the second data format by the receiver of said telegram.

2. The method as claimed in claim 1, wherein:
the data in the first data format are in the form of a bit sequence and the second data format inverts the bit sequence of the first data format.

3. The method as claimed in claim 1, wherein:
the second data format is a character code, for example, an ASCII code.

4. The method as claimed in claim 1, wherein:
the first data format is a data format representing numbers, for example, an integer- or floating point representation.

5. The method as claimed in claim 1, wherein:
it is predetermined by the first, respectively the second, data format, how the data, especially data contained in the wanted data block of the at least one telegram, are interpreted in the case of loading, storing and/or processing.

6. The method as claimed in claim 1, wherein:
the data in a first subblock of the wanted data block are in the first data format and the data in a second subblock of the wanted data block are in the second data format.

7. The method as claimed in claim 6, wherein:
the first and second subblocks are equally large, the first subblock is greater than the second subblock and/or the second subblock is greater than the first subblock.

8. The method as claimed in claim 1, wherein:
data are transmitted via the fieldbus according to the HART protocol.

9. The method as claimed in claim 1, wherein:
a telegram includes, besides the wanted data block, a telegram header leading the wanted data block and a test sum block following the wanted data block.

10. The method as claimed in claim 1, wherein:
in the case, in which the information present in the first and second data formats do not agree, a corresponding error report is output.

11. The method as claimed in claim 1, wherein:
a telegram transmitted via the fieldbus includes, especially in the wanted data block, a sequence counter or a telegram number.

12. The method as claimed in claim 1, wherein:
a telegram transmitted via the fieldbus, especially the wanted data block, contains a time stamp.

13. The use of a method as claimed in claim 1 for fulfillment of a safety function, especially for fulfillment of a safety function according to IEC 61508, or IEC 61511.

* * * * *